United States Patent
Hoffman

[15] 3,651,662
[45] Mar. 28, 1972

[54] GEAR TYPE FLEXIBLE COUPLING

[72] Inventor: Herbert N. Hoffman, Lunenburg, Mass.
[73] Assignee: General Electric Company
[22] Filed: Oct. 19, 1970
[21] Appl. No.: 81,850

[52] U.S. Cl. ...................................................64/9 R
[51] Int. Cl. .........................................F16d 3/18
[58] Field of Search ...................................64/9, 16

[56] References Cited

UNITED STATES PATENTS

| | | | |
|---|---|---|---|
| 2,201,799 | 5/1940 | Serrell et al. | 64/9 |
| 2,823,527 | 2/1958 | Belden et al. | 64/9 |
| 3,521,462 | 7/1970 | Heidrich | 64/9 |
| 3,521,463 | 7/1970 | Heidrich | 64/9 |

Primary Examiner—Kenneth W. Sprague
Attorney—William C. Crutcher, Frank L. Neuhauser, Oscar B. Waddell and Joseph B. Forman

[57] ABSTRACT

A flexible coupling of the gear type is provided with mating teeth that have a substantial radial clearance between the major diameters of the internal and external gear teeth. Provisions for centering the floating member are located at the minor diameters of the respective gear teeth. In this configuration of coupling gear teeth, the lubricating oil is allowed to flow freely through the aforesaid radial clearance, thereby tending to prevent solids, centrifuged out of the lubricant as a result of rotation, from impairing coupling operation.

6 Claims, 4 Drawing Figures

PATENTED MAR 28 1972 3,651,662

INVENTOR:
HERBERT N. HOFFMAN,
BY W. C. Crutcher
HIS ATTORNEY.

3,651,662

GEAR TYPE FLEXIBLE COUPLING

BACKGROUND OF THE INVENTION

This invention relates generally to couplings and more particularly to a gear type flexible coupling for use on rotating shafts.

In rotating machinery where it is necessary to couple a pair of rotating shafts together, it is often necessary to utilize a flexible coupling to allow some freedom of lateral and axial movement to compensate for misalignment and end movements of shafts. For example, connection of the turbine shaft of a marine steam turbine to the gear shaft requires the use of such a flexible coupling. In the gear type flexible coupling it of course is necessary to provide lubrication for the gear teeth.

One of the problems associated with this type of flexible coupling in the prior art has been "freezeup." Freezeup is caused by the continuous buildup of foreign material which is centrifuged out of the lubricating oil during the course of the shaft rotating. Prior art gear type flexible couplings had a very small clearance between the crown portion of the external gear teeth and the root portion of the internal gear teeth so that centering of the floating member could occur generally in this area. This was accomplished by projections on the external teeth which are located in the outermost parts of the coupling, as illustrated in U.S. Pat. No. 2,726,523 issued to J.J. Zrodowski and assigned to the present assignee. Consequently, there was reduced clearance for passage of the flowing lubricating oil to sweep away the buildup of the foreign material. This buildup would continue and oftentimes reach proportions which would impair operation.

Accordingly, one object of the present invention is to provide an improved gear-type flexible coupling which is less sensitive to accumulation of centrifuged foreign matter than prior art couplings.

DRAWING

Other objects and advantages will become apparent from the following description, taken in connection with the accompanying drawing, in which:

FIG. 1 is a view partly in section, showing one coupling arrangement with external floating sleeve, FIG. 2 is an enlarged cross section taken along lines II—II of FIG. 1, FIG. 3 is another coupling arrangement with internal floating sleeve utilizing the invention, and FIG. 4 is yet another modification of the invention showing an alternate arrangement of gear teeth.

SUMMARY OF THE INVENTION

Briefly stated, the invention is practiced by providing a flexible coupling with a floating member and having meshed internal and external gear teeth. The teeth are sized and proportioned to form close clearances at their respective minor diameters, and to form a radial space at their major diameters, so that centering of the floating sleeve takes place at the minor diameters.

DESCRIPTION OF THE PREFERRED EMBODIMENT

Figure 1:
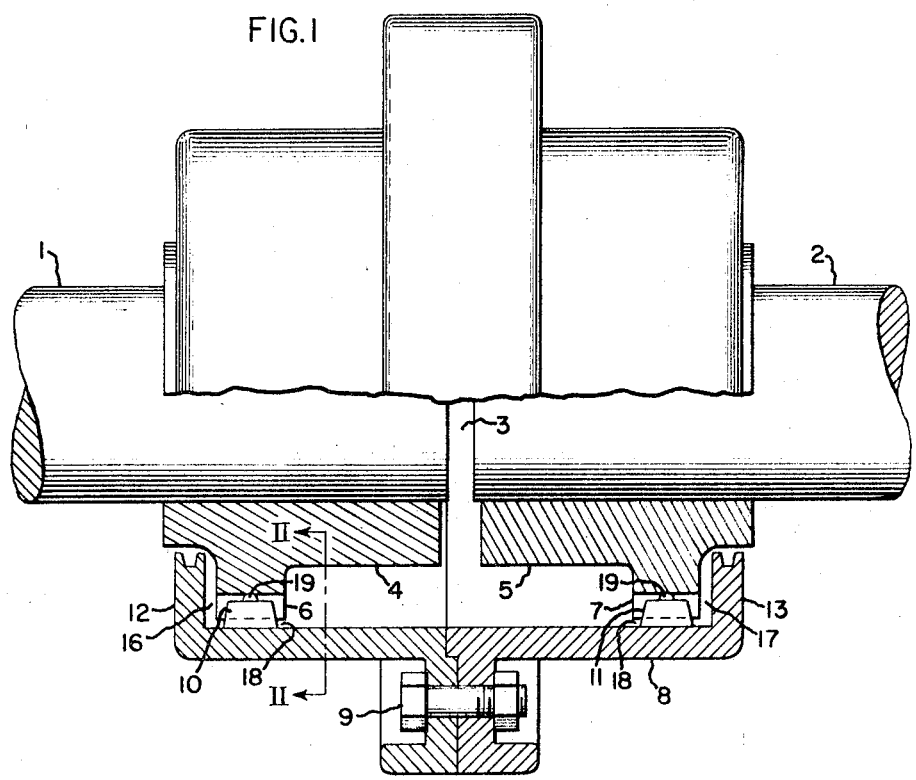

Referring now to FIG. 1, a pair of rotatable shafts are indicated as 1 and 2. Shaft 1 may, for example, be the driving extension of the output shaft on a steam turbine. Shaft 2 may in turn be the driven shaft for a set of reduction gears. A clearance 3 is maintained between shafts 1 and 2 in order to accommodate the axial movements between the two shafts. It will be appreciated that this clearance 3 will accommodate any thermal expansion or other limited movements in the axial direction.

A pair of adjacently opposed hubs are securely attached to shafts 1 and 2 and are indicated as 4 and 5 respectively. Circumferentially spaced around hub 4 are a plurality of external gear teeth 6. Similarly, a plurality of external gear teeth 7 are disposed about the circumference of hub 5. Surrounding the hubs 4 and 5 and their respect external gear teeth 6 and 7 is a two-part generally cylindrical sleeve indicated as 8. The two parts of sleeve 8 are joined together by bolting means indicated at 9. Bolting means are provided so that a disconnection can be made if desired. Disposed about the circumference on the inside of the sleeve 8 so as to be engaged with the external gear teeth 6 and 7 are internal gear teeth 10 and 11 respectively. Internal gear teeth 10 are engageable with external gear teeth 6, and likewise internal gear teeth 11 are engageable with external gear teeth 7. Circumferential rings 12 and 13 are provided at either end of the sleeve 8 in order to maintain the floating sleeve 8 in its proper axial relationship to shafts 1 and 2 during operation and to retain the lubricant in the coupling.

Lubrication for the coupling shown in FIG. 1 is of the "-sealed lube" type, wherein the space inside the coupling is filled while at standstill through a plug (not shown). The lubricant is retained in place by the rings 12 and 13 and when the coupling rotates, it is centrifuged against the inner wall of sleeve 8 to a depth sufficient to cover the gear teeth.

Figure 2:
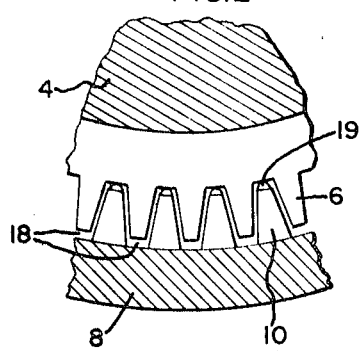

Referring now to FIG. 2 of the drawing, it will be seen that rounded or nub portions 19 are provided on the tips of the internal gear teeth 10 and 11. These nub portions are axially shorter than the "working" portions of the teeth, the latter working portions being substantially the same in radial dimension as the external teeth 6, 7. These nub portions on internal teeth 10, 11 form close clearances with the roots of external gear teeth 6 and 7 at the minor diameters of the respective gear teeth. The rounded nubs provide for small angular misalignments between shafts while keeping the floating sleeve 8 centered at high speed. Although such centering nubs have been employed in the past, they have been located on the external teeth with centering taking place at the major diameters of the teeth.

The radial dimension of an internal gear tooth, including the working portion as well as the added nub 19, may be on the order of 1.10 times the depth of a mating external gear tooth. Thus a relatively large radial clearance shown at 18 on the order of 10 percent of the tooth height is provided at the major diameters of the respective gear teeth, i.e., between the tips of external teeth 6, 7 and the corresponding roots of internal teeth 10, 11.

Figure 3:
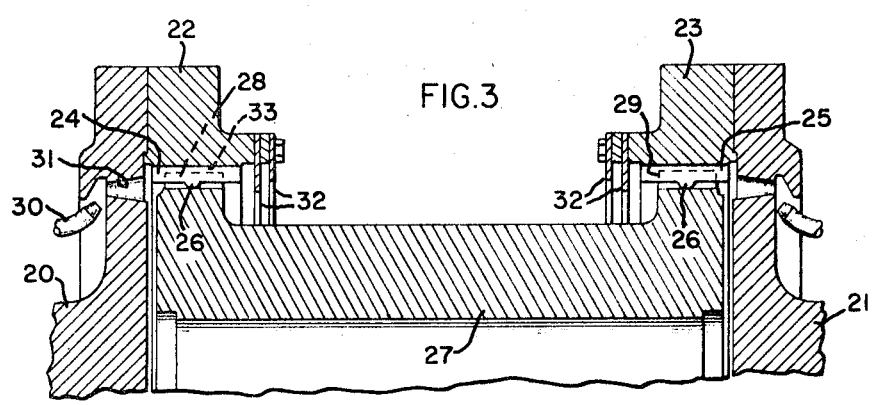

A slightly different type of flexible coupling is shown by reference to FIG. 3 of the drawing, wherein a coupling having a continuous lubrication system such as shown in the aforementioned Zrodowski U.S. Pat. No. 2,626,523 is shown. In this construction, the external teeth are on the floating torque transmitting sleeve between shafts while the internal teeth are on the driving and driven members.

In FIG. 3, the driving hub 20 and driven hub 21 have ring members 22, 23 respectively attached thereto. Ring member 22 has internal gear teeth 24, while ring 23 has internal gear teeth 25, both of these being provided with centering nubs 26 as before. Torque transmission between rings 22, 23 is provided by means of a hollow torque sleeve 27 having external teeth 28, 29. The centering nubs form close clearances with the roots of the external teeth 28, 29 at the minor diameters of the meshed teeth, as before.

Continuous lubrication is provided, as in the aforementioned Zrodowski patent by means of a oil nozzle 30, a hole 31 in the hub flange, and a series of rings 32 forming a dam. The lubrication system at the other end of the coupling is the same. Oil flows between the space 33 at the major diameter or root of the internal gear teeth 24 and out of the coupling over rings 32.

Figure 4:
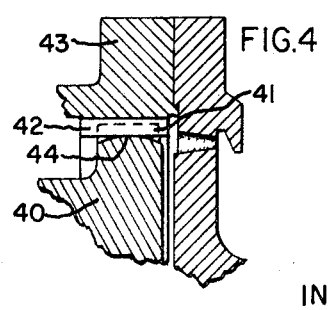

FIG. 4 shows another modification of the invention wherein, instead of nubs on the tips of the internal teeth forming close clearances with straight roots, the tips of the internal teeth are straight and the roots of the external teeth are crowned. Referring to FIG. 4, a fragmentary view of meshed teeth is shown, which may be substituted for previously described constructions. A sleeve portion 40 has external teeth 41 meshed with internal teeth 42 of ring 43. The roots of teeth 41 are crowned as shown at 44 to form close clearances with straight tips of internal teeth 42 at the respective minor diameters of the teeth. The teeth are sized so that a substantial radial clearance is provided at the major diameters of the teeth between the floating sleeve 40 and ring 43.

OPERATION OF THE INVENTION

As the flexible coupling is brought up to speed and during relative movement between the shafts 1 and 2 in FIG. 1, centering of the floating sleeve in all three embodiments is maintained within close limits at the minor diameters of the gear teeth while space for lubricating oil is provided at the major diameters.

During rotation at speed, entrained material in the lubricating oil will centrifuge out and deposit on the oil containing surfaces most remote from the center of rotation. The radial clearances provide space for free circulation of lubricant which tends to retard the accumulation of deposits in these critical areas plus providing more space for centrifuged-out deposits. If they do accumulate in these areas, this lengthens the between-service intervals and decreases the likelihood of coupling freezeup resulting from the centrifuging action on the lubricant caused by the rotation of the coupling.

In the continuous lubrication type coupling shown in FIG. 3, the lubricant flows continuously from nozzles 30 and through the spaces 33 at the inner wall of sleeves 22, 23 carrying along any deposits or foreign materials which would cause freezeup. Centering of the torque sleeve 27 takes place at the inner radius where the nubs 26 contact the roots of the external gear teeth 28, 29 on the sleeve.

In the modification of FIG. 4 an alternate arrangement is shown, which is the same in operation but which may be preferable, depending on available manufacturing equipment.

Thus, by means of the present invention, an improved flexible coupling has been disclosed which is less sensitive to centrifuging of foreign particles in the lubricant. The improvement is equally beneficial to the sealed lube or to the continuous lubrication type of system.

While there has been described herein what is considered to be the preferred embodiment of the invention, other modifications will occur to those skilled in the art, and it is intended to cover in the appended claims all such modifications as fall within the true spirit and scope of the invention.

What is claimed is:

1. An improved high speed flexible coupling of the gear type having a pair of axially spaced rotatable hub members and a floating sleeve member extending between said hub members, said members having coaxial overlapped portions at opposite ends of the sleeve defining meshed internal and external gear teeth flexibly coupling said hub members through the sleeve member, wherein the improvement comprises:

said internal and external gear teeth being sized and proportioned so as together to define close clearances at their respective minor diameters and together to define a substantial radial clearance at their respective major diameters, thereby allowing centering to occur substantially at the minor diameters of said gear teeth.

2. The coupling according to claim 1, further including a source of lubricating oil to said radial clearance between the internal and external gear teeth together with means to cause the oil to flow continuously through said radial clearance.

3. The coupling according to claim 1, wherein each of said internal gear teeth includes a working portion of substantially the same radial depth as a respective external tooth, and a centering portion comprising a rounded nub of shorter axial length than said working portion and disposed on the end thereof.

4. The coupling according to claim 1, wherein each of said external gear teeth are connected by a root portion, said root portion being curved in an axial direction to provide a crowned root forming close clearances with the tips of said internal gear teeth.

5. The coupling according to claim 1, wherein said external teeth are disposed on opposite ends of said sleeve member and wherein said internal teeth are disposed on said hub members.

6. The combination according to claim 1, wherein said internal teeth are disposed on opposite ends of said sleeve member and wherein said external teeth are disposed on said hub members.

* * * * *